United States Patent [19]

Aalto et al.

[11] Patent Number: 4,697,607

[45] Date of Patent: Oct. 6, 1987

[54] PROCEDURE AND MEANS FOR MAKING THE EFFECT OF GRAVITY THE SAME IN FLOW REGULATORS INDEPENDENT OF THE INSTALLATION MODE

[75] Inventors: Erkki Aalto; Veikko Ylä-Hemmilä, both of Kausala, Finland

[73] Assignee: Halton Oy, Finland

[21] Appl. No.: 694,519

[22] PCT Filed: May 17, 1984

[86] PCT No.: PCT/FI84/00037

§ 371 Date: Jan. 7, 1985

§ 102(e) Date: Jan. 7, 1985

[87] PCT Pub. No.: WO84/04803

PCT Pub. Date: Dec. 6, 1984

[30] Foreign Application Priority Data

May 20, 1983 [FI] Finland .................... 831801

[51] Int. Cl.$^4$ ................... F17D 1/04; F15D 1/02
[52] U.S. Cl. ............................ 137/1; 137/519; 137/556; 251/285; 251/286; 138/46
[58] Field of Search ............ 137/519, 556, 557, 1, 137/8; 251/285, 286, 287, 305; 138/45, 46

[56] References Cited

U.S. PATENT DOCUMENTS

| | | | |
|---|---|---|---|
| 41,644 | 2/1864 | Shaw ................... | 251/287 |
| 1,281,645 | 7/1970 | Penzensky . | |
| 1,306,006 | 6/1919 | Gustafson ............. | 251/285 |
| 1,311,202 | 7/1919 | Anderson ............. | 137/499 |
| 1,766,876 | 6/1930 | Busby . | |
| 2,247,090 | 6/1941 | Jones et al. .......... | 251/285 |
| 2,376,178 | 5/1945 | Ornstein ............... | 137/557 |
| 2,778,223 | 1/1957 | Kimbrell .............. | 137/557 |
| 3,428,291 | 2/1969 | Callahan, Jr. et al. .. | 137/556.3 |
| 3,538,945 | 11/1970 | Dean, Jr. ............... | 137/499 |
| 3,905,390 | 9/1975 | Pysh ..................... | 137/519 |
| 4,420,438 | 12/1983 | Goosen ................. | 251/305 |
| 4,523,609 | 6/1985 | Weck .................... | 137/499 |

FOREIGN PATENT DOCUMENTS

| | | | |
|---|---|---|---|
| 74254 | 3/1918 | Austria ................. | 137/519 |
| 2448271 | 4/1976 | Fed. Rep. of Germany . | |
| 2635338 | 4/1978 | Fed. Rep. of Germany . | |
| 3128726 | 2/1983 | Fed. Rep. of Germany . | |
| 64995 | 10/1983 | Finland . | |
| 775544 | 12/1934 | France ................. | 137/519 |
| 1313310 | 11/1962 | France . | |
| 2392302 | 12/1978 | France . | |
| 48558 | 5/1917 | Sweden . | |
| 302677 | 7/1968 | Sweden . | |
| 400391 | 3/1978 | Sweden . | |

Primary Examiner—Alan Cohan
Assistant Examiner—John A. Rivell
Attorney, Agent, or Firm—Steinberg & Raskin

[57] ABSTRACT

The present invention concerns a way and a means for rendering equal the effect of gravity independent of the mode of installation in flow regulators for gaseous substances, particularly for air in air-conditioning and ventilation installations, and for maintaining the volumetric flow of the gaseous substance at desired magnitude with sufficient accuracy when the differential pressure acting across the flow regulator varies within given limits. The flow regulator comprises an envelope and a regulating member turnably disposed in the flow passage confined by the envelope. The torque produced by the flow of gaseous substance on the regulating member and on the other hand a countertorque dependent on the position of the regulating member cause the regulating member turning in the flow passage to assume a position of equilibrium such that the requisite pressure drop is obtained for maintaining the volumetric flow rate at predetermined magnitude. The regulating member is first balanced, e.g. in connection with manufacturing, without countertorque dependent on the position of the regulating member. Thereafter, a member providing the countertorque by its mass is reset by turning the member about the turning axis of the regulating member as much, but in the opposite direction, as the current mode of installation deviates from the basic installation. The means comprises a member supporting the weight providing the countertorque by its mass, connected to a turnably disposed member. In a mode of installation deviating from the basic installation, the member supporting the weight may be turned with reference to said turnably disposed member.

17 Claims, 12 Drawing Figures

4,697,607

PROCEDURE AND MEANS FOR MAKING THE EFFECT OF GRAVITY THE SAME IN FLOW REGULATORS INDEPENDENT OF THE INSTALLATION MODE

BACKGROUND OF THE INVENTION

The present invention concerns a way in which to render equal the effect of gravity independent of the installation mode in flow regulators for gaseous substances, in particular for air in air-conditioning and ventilation installations, serving to maintain the volumetric flow of a gaseous substance at desired magnitude with sufficient accuracy when the differential pressure across the flow regulator varies within given limits, said flow regulator comprising an envelope and a regulating member turnably disposed in a flow passage confined by the envelope, the torque exerted by the flow of the gaseous substance on the regulating member and on the other hand a countertorque dependent on the position of the regulating member causing the regulating member turning in the flow passage to assume a position of equilibrium in which the required pressure drop is obtained for keeping the volumetric flow at predetermined magnitude.

The invention also concerns means for rendering equal the effect of gravity independent of the installation mode in flow regulators for gaseous substances, in particular for air in air-conditioning and ventilation installations, serving to maintain the volumetric flow of a gaseous substance at desired magnitude with sufficient accuracy when the differential pressure across the flow regulator varies within given limits, said flow regulator comprising an envelope and a regulating member turnably disposed in a flow passage confined by the envelope, the torque exerted by the flow of the gaseous substance on the regulating member and on the other hand a countertorque dependent on the position of the regulating member causing the regulating member turning in the flow passage to assume a position of equilibrium in which the required pressure drop is obtained for keeping the volumetric flow at predetermined magnitude.

In low pressure regulators of prior art, which allow fairly wide regulation of the volumetric flow set-point, the lowest pressure at which the means starts to operate increases with increasing volumetric flow rate. Even at small volumetric flows, the lowest pressure is usually relatively high. The high end pressure also increases with increasing volumetric flow rate set-point.

Because the lowest pressure is high and/or because it depends on the volumetric flow set-point value, the regulators of prior art, in order to function, require extra blower energy and possibly a bigger blower; owing to the increase of pressure they tend to cause noise problems; they impede the designing work, and they cause difficulties in the implementation phase of the installation.

In general, the setting of the volumetric flow in flow regulators at the site of installation with accuracy and steplessly is exceedingly difficult and often impossible in practice, particularly if the regulator has been installed already, and it is also a fact that the flow rate setting cannot be directly read. Regulators of prior art also do not allow the throttling pressure to be read with which the regulator impedes the flow. It is true that in certain regulator designs of prior art one may observe from the outside whether the regulator is within its operating range, but they allow no regulation of the volumetric flow rate.

A prerequisite of serial manufacturing, storing, distribution and convenient use of regulators is that they can with ease and accuracy be regulated at the site of installation, also after installation. It is important with a view to the balancing and inspection of an air conditioning installation that it is possible to observe from outside the regulator which set-point value of volumetric flow has been selected, whether the regulator is within its operating range, and how strongly the regulator throttles the flow.

In addition, the basic construction and the manufacturing technology of the regulator shall be such that the required calibration measures are as simple and as few as possible and independent of the setting of volumetric flow.

In regulators known at present, the movement of the regulating member cannot be steplessly limited. Therefore, regulators of prior art cannot be used at all for mere balancing based on so-called single pass regulation, which would eliminate the risk of binding of the means. Secondly, regulators of prior art cannot be used for restricted and controlled correction. Thirdly, regulators of prior art cannot be used in the best possible way in air conditioning installations where the air quantities are varied, e.g. different air quantities in the daytime and during the night.

In regulators of prior art, the force that is used to counteract the regulating member is a mass or a spring, or a spring and bellows in combination. Each design has its advantages and disadvantages. Disadvantages connected with the use of springs are e.g. their relaxing, inaccuracies of manufacture, liability to suffer damage, etc. Disadvantages encountered when a mass is used as counterforce are the facts that the regulator can only be installed in a horizontal duct or passage, that the axis has to be horizontal with reference to the direction of flow at all times and that the mass must always be on one and the same side of the passage. Advantages of a mass in the role of counterforce are, for instance, reliability in use, manufacturing accuracy and permanence. Disadvantages of the use of springs combined with bellows are that the design is more liable to disturbances and more expensive than a mere spring and has a shorter life span.

In regulators of prior art a particular damping means is required to allay the oscillations, or hunting, of the regulating member. In some designs of prior art, damping of the dashpot type is used. In another regulator of prior art, bellows type damping is used. Disadvantages of the damping designs described above are, for instance, that the damping designs may in the course of time either bind or be blocked or break, that they require maintenance, and that they may impair the accuracy.

SUMMARY OF THE INVENTION

The object of the invention is to provide an improvement of regulator designs known in the art. The more detailed aim of the invention is to teach a way in which the effect of gravity is made the same independent of the installation mode.

The aims of the invention are achieved in a way which is mainly characterized in that the regulating member is balanced first without a countertorque dependent on the position of the regulating member, and that thereafter the member providing the countertorque with its mass is again set by turning the member around the turning axis of the regulating member the same amount but in the opposite direction as the particular installation mode differs from a separately determined basic installation.

The means of the invention is in turn mainly characterized in that the means comprises a member supporting a weight which by its mass produces the countertorque, and connected to a turnably disposed member, whereby in an installation mode deviating from the basic installation mode, the member supporting the weight can be turned with reference to said turnably disposed member.

In an advantageous embodiment of the invention, the means comprises pointer means disposed to indicate the current mode of installation. In an advantageous embodiment, the pointer means is provided with a scale. In an advantageous embodiment, the member supporting the weight is provided with a scale corresponding to the scale of the pointer means. In an advantageous embodiment, the means comprises a levelling instrument for the turning shaft of the regulating member.

Several advantageous embodiments of the invention are characterized in that the regulating member is a slightly curved plate. The turning angle between the initial and ultimate positions of the regulating member is substantially of the same order at different volumetric flow rates, the differential pressure being the same. The initial and ultimate positions of the regulating member are dependent on the magnitude of the volumetric flow rate, the differential pressure being the same. The flow regulator is advantageously provided with adjustable and/or self-adjusting limiting members to limit the differential pressure range of the flow regulator, the limiting members being disposed to limit the angular movement of the regulating member. The operating range of the flow regulator is also advantageously changeable by changing the effective flow aperture between the regulating member and the flow passage. Similarly, the operating range of the flow regulator is advantageously changeable by the aid of a shiftable mass producing a countertorque dependent on the position of the regulating member.

By the flow regulator of the invention several remarkable advantages are gained. Firstly, in the flow regulator of the invention a mass is used advantageously for counterforce. However, in the regulator of the invention the disadvantages of a mass have been eliminated in practice. The flow regulator of the invention may be installed in a passage with any direction, and the mass used for counterforce can be disposed on either side of the passage or duct. This is based on the fact that the turning axis of the regulating member is mounted horizontally by the aid of a levelling means provided in the flow regulator, and the mass is moreover so positioned that the mass is turned through the same angle but in opposite direction as is the deviation of the particular instance of installation from a separately determined basic installation, which is advantageously the horizontal installation.

Secondly, the set-point value of the flow regulator can be regulated in a relatively wide volumetric flow range, e.g. duct velocity 2-8 m/s, without any change of the pressure range in which the flow regulator operates. However, the flow regulator operates with lower differential pressure, e.g. about 20 Pa, then any regulator known in prior art, where the operating range is 20-200 Pa throughout. In the regulator of the invention, it has been understood to make use of a turning angle of the regulating member about 90°, thus affording, with additional adjustment of the effective flow aperture, a large movement of the regulating member relative to the change of differential pressure, and a relatively wide operating range.

Thirdly, in the regulator of the invention the volumetric flow rate can be regulated steplessly and simply at the site of installation, even if the regulator has already been installed, simply by turning a control knob on the flow regulator. The volumetric flow rate may be directly read on a scale, as well as the degree in which the regulator throttles the flow, and whether the regulator is within its operating range, i.e. whether the regulator admits the correct air quantity, or too little or too much.

Fourthly, in the flow regulator of the invention the movement of the regulating member may be limited, or the movement of the regulating member may, if needed, be entiely arrested. Thanks to this characteristic feature, the flow regulator of the invention may also be used in applications such as balancing based merely on so-called single pass regulation. Secondly, the flow regulator may be used for minor controlled correction, and thirdly the flow regulator may successfully be used in air-conditioning installations where centralized altering of the air flows is desirable.

The flow regulator of the invention also requires no separate oscillation inhibiting means, certainly no oscillation inhibitor which would be likely to bind or accumulate dirt or be blocked; as a rule the counterpressure in the duct system is alone enough to keep the regulating member stable. Factors contributing to this favourable feature are in the first place that the regulating member is slightly curved and that the regulating does not nearly completely close the passage in any position. As a result, the air is enabled to flow past on all sides of the regulating member even when the regulating member is in the "closed" position. Further factors contributing to the favourable feature just described are for instance the size and shape of the regulating member, the location of the turning axis of the regulating member with reference to the regulating member, the size and location of the counterweight, and the limiters of the regulating member.

Thanks to the slightly curved regulating member, the flow regulator can be made accurate, silent, and a slightly curved regulating member like this moves smoothly from one end position to the other.

BRIEF DESCRIPTION OF THE DRAWINGS

The invention is described in detail, referring to an advantageous embodiment of the invention presented in the figures of the drawing attached, but to which the invention is not meant to be exclusively confined.

DESCRIPTION OF THE PREFERRED EMBODIMENTS

Figure 1:
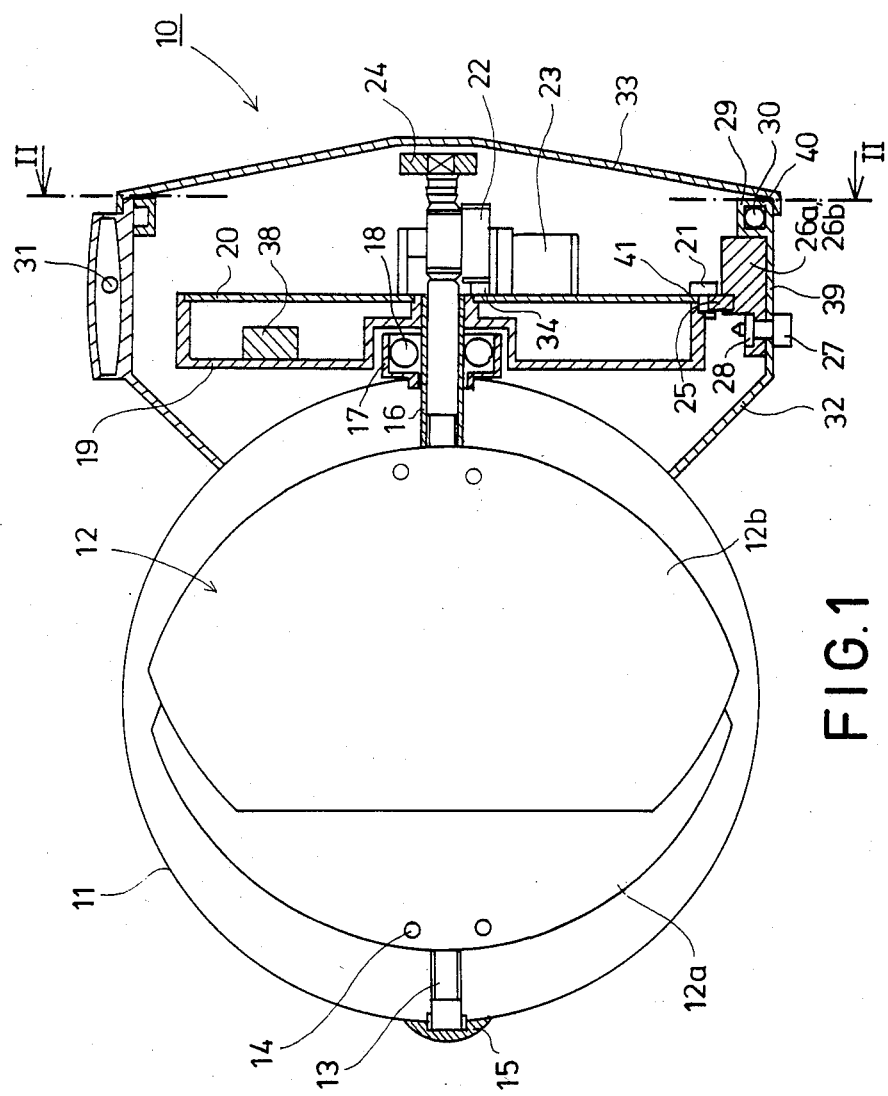
FIG. 1 presents an advantageous embodiment of the invention in partly sectioned elevational view.
Figure 2:
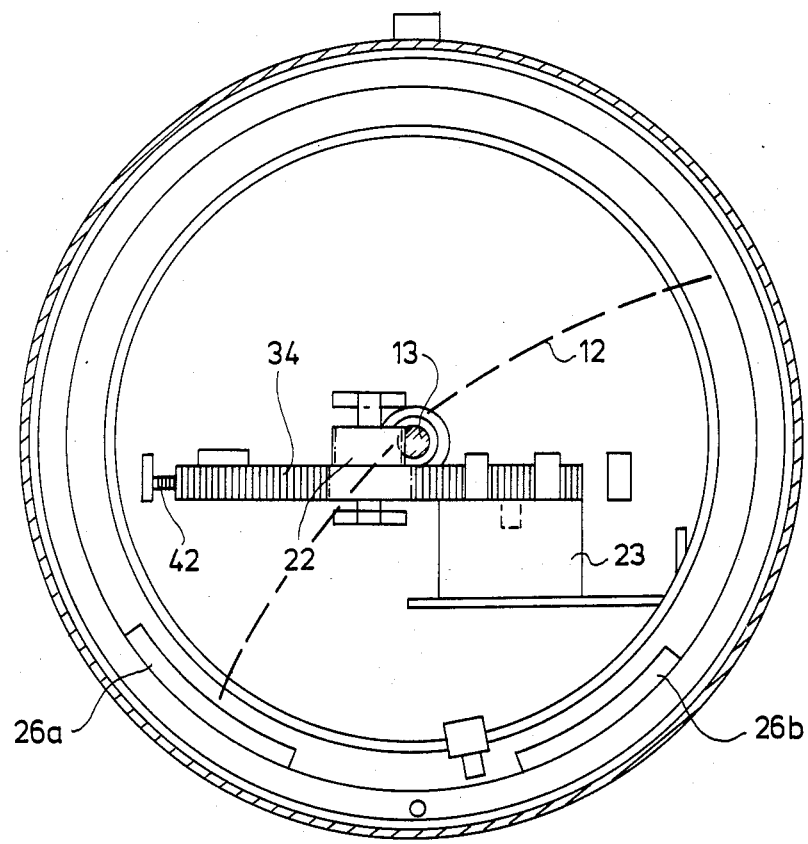
FIG. 2 shows the section along the line II—II in FIG. 1.

In the embodiment of FIGS. 1 and 2, the contant flow regulator of the invention has been generally indicated by reference numeral 10. The regulator 10 comprises an envelope 11 and a regulating member 12 disposed within the envelope 11. In this embodiment, the regulating member 12 is a curved flap-like regulating member composed of two curved flaps 12a and 12b overlapped with each other. The regulating member 12 is attached to a turnable shaft 13 by the aid of a regulating and fixing nut 14 and a combined sleeve, regulating and fixing nut 16. The shaft 13 is rotatably carried by bearings 15 and 18 in the envelope 11. The regulating member 12 turns by effect of the air flowing in the flow passage confined by the envelope 11, and the countertorque generated by the weight 23 is disposed to set the regulating member 12 in a position producing the requisite throttling. The weight 23 is integrally connected with the regulating member 12 by means of the sleeve, control and fixing nut 16 and by a member 19 and cover 20 rotatably attached thereto, and it rotates along with the turning of the regulating member 12. The axis 13 is installed horizontally by the aid of a balance and a levelling ball 31 in the protecting case 32.

The operating range of the constant flow regulator 10, as regards volumetric flow rate, can be changed by turning the regulating knob 24, whereby in this embodiment the size of the flap-resembling regulating member 12 and simultaneously the effective flow aperture, the location of the weight 23 and the initial and ultimate positions of the regulating member 12 are changed. The halves 12a and 12b of the flap-like regulating member 12 move in different directions with reference to each other on the shaft 13, by effect of the different-handed threads on the shaft 13 and in the regulating nuts 14,16. One end of the shaft 13 is laterally fixed in the bearing 15, whereby the effect of the adjustment also causes the member 19, which has by mediation of the sleeves 16 been mounted on the flap-like closing member 12 on one half 12b thereof rotatably, and the cover, attached to said member 19, to move in the direction of the shaft 13. The gear 22 attached to the cover 20 is in contact with the shaft 13, and the gear 22 is due to the grooves formed by a pinion rack on the shaft 13 and to the sidewise movement of the rotatably disposed member 19 set in rotation, whereby the gear 22 at the same time by means of the pinion rack 34 shifts the weight 23.

Figure 3A:
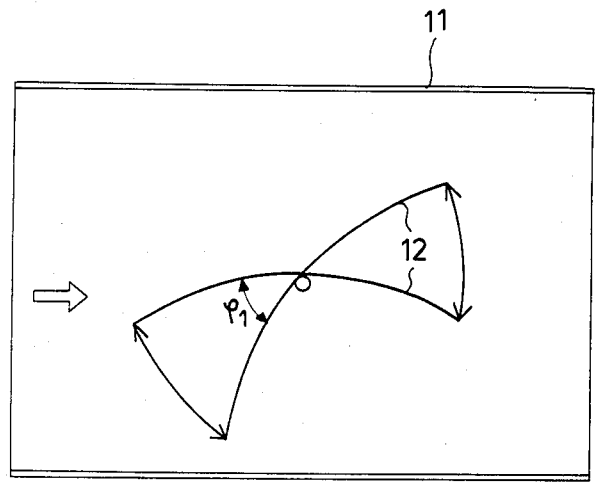
FIG. 3A presents in elevational view the initial and ultimate positions of the regulating member of the flow regulator at high volumetric flow rate.
Figure 3B:
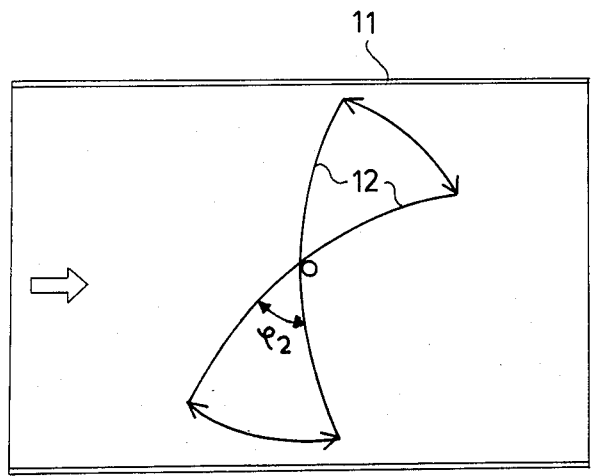
FIG. 3B presents in elevational view the initial and ultimate positions of the regulating member of the flow regulator at low volumetric flow rate.

In FIGS. 3A and 3B, it is observed that a high volumetric flow rate, at the smallest differential pressure of the operation range, the regulating member 12 is in a more horizontal position than at a small volumetric flow rate at the corresponding differential pressure. Similarly, it is observed that at a small volumetric flow rate at the highest differential pressure of the operation range, the regulating member 12 is in a more vertical position than at a large volumetric flow at the corresponding differential pressure.

The position of the regulating member 12 at the highest volumetric flow rate and at the smallest differential pressure of the operation range advantageously deviates about 90° from the position of the regulating member 12 at the smallest volumetric flow rate and the highest differential pressure of the operation range. In contrast, the turning angle $\phi_2$ is substantially of the same order as the respective turning angle $\phi_1$ for high volumetric flow rate when the differential pressure is the same. Thus, in the regulator 10 of the invention the rotation angle $\phi_1$, $\phi_2$ of the regulating member 12 for the minimum and maximum differential pressure is substantially of the same order at different volumetric flow rates. At the same minimum and maximum values of the differential pressure $\Delta p$, the angle of rotation $\phi_1$, $\phi_2$ is advantageously about 60°.

Figure 4A:
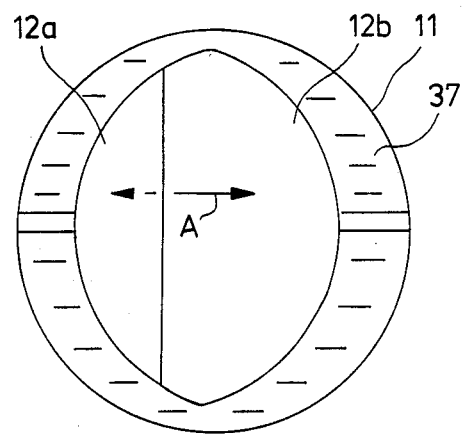
FIG. 4A presents the effective flow aperture of the flow regulator of the invention at its smallest, with the regulating member so regulated that the effective flow aperture is large, viewed in the direction of flow.
Figure 4B:
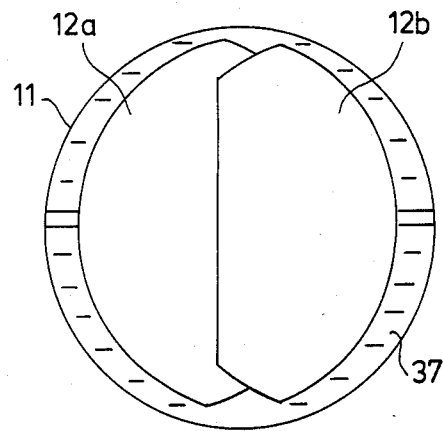
FIG. 4B presents the effective flow aperture of the flow regulator of the invention at its smallest, with the regulating member so regulated that the effective flow aperture is small, viewed in the direction of flow.

In the embodiment of FIGS. 4A and 4B, in the flow regulator 10 of the invention the effective flow aperture 37 is changed by regulating the size of the regulating member 12. In this embodiment, the size of the effective flow aperture 37 is changed by moving the halves 12a and 12b of the flap-resembling regulating member 12 in the manner indicated by the arrow A in FIG. 4A.

Figure 4C:
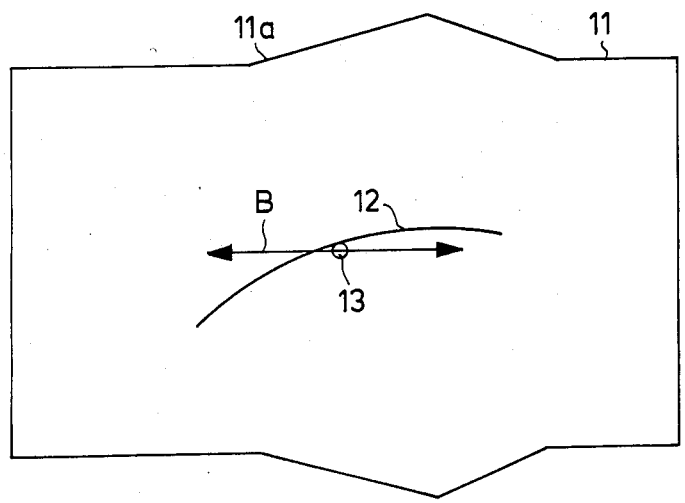
FIG. 4C illustrates in elevational view the changing of the effective flow aperture of the flow regulator in a flow passage with variable cross section.

In the embodiment of FIG. 4C, the effective flow aperture 37 is changed by moving the regulating member 12 in the flow passage 11,11a with variable cross-section as indicated by the arrow B, in other words, by shifting the regulating member 12 in the direction of flow.

Figure 4D:
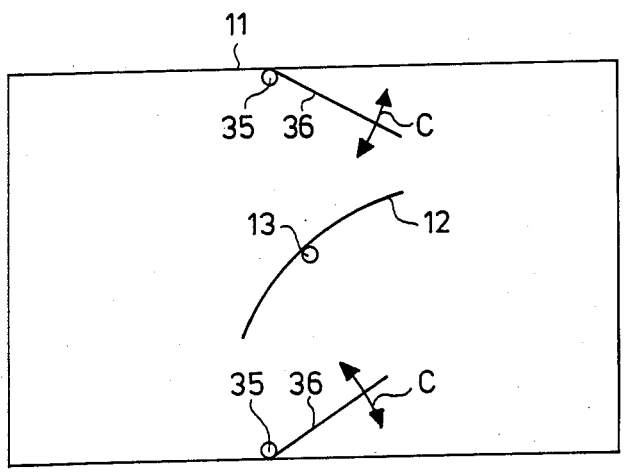
FIG. 4D illustrates in elevational view the changing of the effective flow aperture of the flow regulator by means of a separate regulating member.

In the embodiment of FIG. 4D, the effective flow aperture 37 is changed by regulating the flow aperture by the aid of a separate regulating member 36, consisting of one or several parts, placed in the flow passage. The shafts of the regulating members 36 are denoted by the reference numeral 35. The regulating members 36 may be rotated around the axes 35 as indicated by arrows C.

Figure 5:
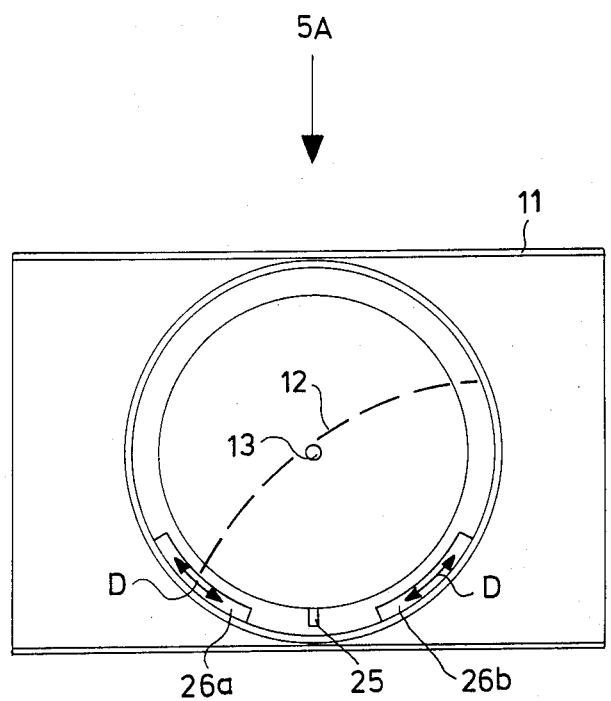
FIG. 5 presents the principle of limiting the differential pressure range of the flow regulator, in a schematic elevational view.
Figure 6:
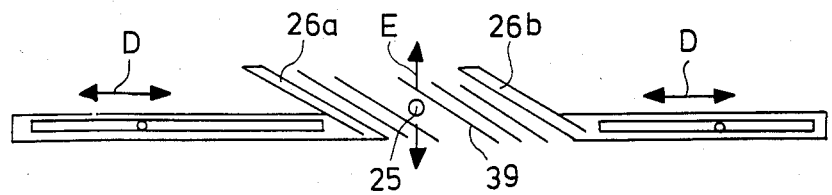
FIG. 6 shows a detail of FIG. 5 viewed in the direction 5A.

In the flow regulator 10 of the invention, the differential pressure range is limited by limiting members 25 and 26a,26b. When the limiters 26a and 26b are moved as indicated by arrows D in FIG. 5, the movement of the regulating member 12 is limited. The limiters 26a and 26b are advantageously self-regulating limiting members in accordance with the volumetric flow rate that has been selected, as shown in FIG. 6. The limiters 26a and 26b have bevelled faces in that case. The limiters 26a and 26b regulate themselves when a limiter pin 25 moves as the volumetric flow rate is regulated, in the manner indicated by the arrow E in FIG. 6. The movement of the flap-like regulating member 12 of the constant flow regulator 10 may also be arrested totally or partially with the aid of the adjustable limiters 26a and 26b. The limiter pin 25 and the adjusting scale 39 on the protective case 32 indicate the differential pressure $\Delta p$ acting across the constant flow regulator 10. When the limiter pin 25 touches the limiter 26a, the differential pressure Δp is at the lowest, and at the limiter 26b it is at the highest (FIG. 6). When the limiter pin 25 is intermediate between the limiters 26a and 26b, the means is in the operating range; if not, either too much or too little air is admitted.

Figure 7:
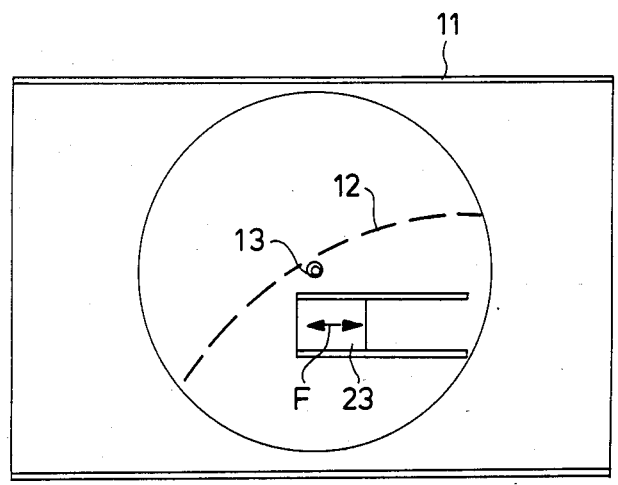
FIG. 7 shows a way of changing the operating range of the flow regulator of the invention, in a schematic elevational view.

As shown in FIG. 7, the operating range of the flow regulator 10 can be changed by the aid of a movable mass or weight 23 by shifting the weight 23 as indicated by the arrow F.

The weight 23 and the limiting members 25 and 26a,26b automatically assign different initial and ultimate positions to the flap-like regulating member 12 at different volumetric flow rates.

Figure 8:
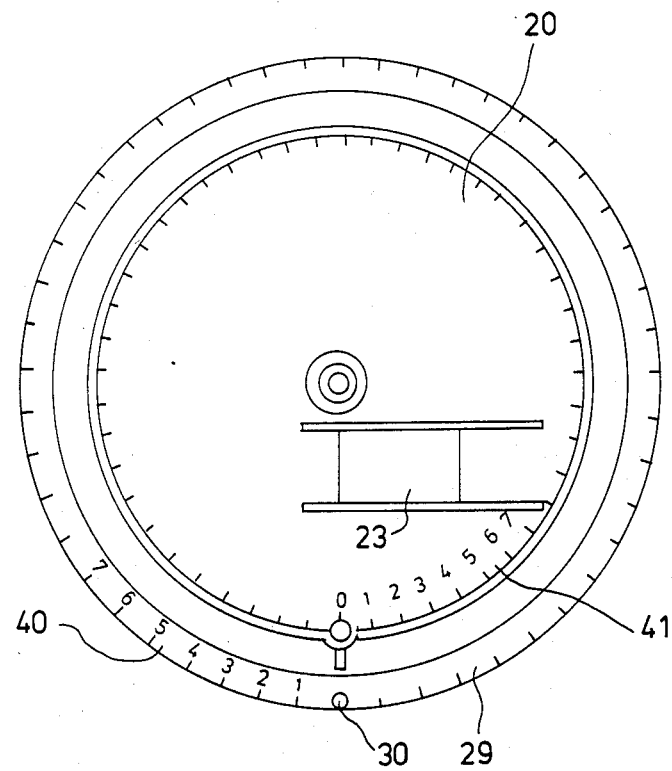
FIG. 8 presents the flow regulator as in FIG. 1, viewed in the direction of the cover of the protective case, said cover being removed.

As shown in FIGS. 1, 2 and 8, in the constant flow regulator 10 of the invention, the effect of gravity can be made the same independent of the installation mode by the aid of the fixable cover 20 which is adjustable with reference to the turning axle 13 of the regulating member 12, of the ball case 29 on the protecting case 32 and of the ball 30 moving in the case 29. The constant flow regulator 10 is balanced by a blancing weight 38 in connection with manufacturing, first without the counter-torque produced by the weight 23. The ball 30 and the scale 40 on the case 29 show in which position the means is. The cover 20 is turned to a position corresponding to the position indicated by the ball 30 by the aid of a scale 41 on the cover 20 and is locked by a set screw 21. The shaft 13 is installed horizontally by the aid of a level and a levelling ball 31 on the protecting case.

In the foregoing only certain advantageous embodiments of the invention have been presented, and it is obvious that numerous modifications thereof are feasible within the inventive idea stated in the attached claims. For instance, it is not meant to confine the invention exclusively to ducts with circular cross section.

What is claimed is:

1. A method for rendering equal the effect of gravity independent of the mode of installation in flow regulators for gaseous substances, particularly for air in air-conditioning and ventilation installations, and for maintaining the volumetric flow rate of the gaseous substance at desired magnitude with sufficient accuracy when differential pressure acting across the flow regulator varies within given limits, said flow regulator comprising an envelope and a regulating member turnably disposed in a flow passage confined by the envelope, said regulating member turning with increasing differential pressure progressively crosswise with reference to the direction of flow, a torque produced by the gaseous substance on the flow regulating member and a countertorque dependent on the position of the regulating member causing the regulating member turning in the flow passage to assume an equilibrium position such that the requisite pressure drop for maintaining the volumetric flow at pre-selected magnitude is achieved, comprising the steps of first balancing the regulating member without the countertorque dependent on the position of the regulating member, and
    thereafter resetting a weight producing the countertorque by its mass, by rotating said weight around a turning axis of the regulating member as much, but in the opposite direction, as the current mode of installation deviates from a separately defined basic installation.

2. A procedure according to claim 1, comprising the additional step of
    installing the turning axis of the regulating member in a substantially horizontal position.

3. The method of claim 2, comprising the additional step of
    changing the equilibrium position of the regulating member by rotating knob means connected with said axis and, through gear means, with said countertorque-producing weight,
    whereby position of said countertorque producing weight is shifted by rotation of said axis through said knob means.

4. The method of claim 2, wherein said turning axis is installed by levelling a ball disposed on a protective casing about said axis.

5. The method of claim 1, wherein
    the regulating member is first balanced by a balancing weight connected with said turning axis, and
    said countertorque-producing weight is then reset by rotating said countertorque-producing weight until a scale engaged with the countertorque-producing weight being rotated, is aligned with a pointer indicating the current mode of installation.

6. Means for rendering equal the effect of gravity independent of the mode of installation in flow regulators for gaseous substances, particularly for air in air-conditioning and ventilation installations, and for maintaining the volumetric flow rate of the gaseous substance at desired magnitude with sufficient accuracy when differential pressure acting across the flow regulator varies within given limits,
    said flow regulator comprising an envelope and a regulating member turnably disposed in a flow passage confined by the envelope, said regulating member disposed to turn with increasing differential pressure progressively crosswise with reference to the direction of flow and assume an equilibrium position in response to a torque produced by the gaseous substance on the flow regulating member and a counter-torque dependent on the position of the regulating member, such that the requisite pressure drop for maintaining the volumetric flow at pre-selected magnitude is achieved,
    the means comprising a member supporting a weight which by its mass produces the countertorque,
    said weight-supporting member being connected to a turnably disposed element and,
    both the member supporting the weight and the weight are turnably mounted with reference to said turnably disposed element,
    with angular setting of the weight-supporting member relative to the regulating member being adjustable, and
    the flow regulator adapted to be installable in different orientations without affecting the countertorque produced by the weight.

7. The means according to claim 6, characterized in that the means comprise pointer means disposed to indicate the current installation mode.

8. The means according to claim 7, characterized in that the pointer means are provided with a scale.

9. The means according to claim 8, characterized in that the member supporting the weight is provided with a scale corresponding to the scale of the pointer means.

10. The means according to claim 6, further comprising levelling means for a turning axis of the regulating member.

11. The means of claim 6, additionally comprising
a turning axis upon which said regulating member is situated, and
a sleeve situated about said turning axis, and interconnecting said regulating member with said turnably-disposed element, weight-supporting member, and weight.

12. The means of claim 6, wherein said turnably disposed element is mounted upon said regulating member.

13. The means of claim 12, wherein said regulating member comprises two curved flaps, with said turnably disposed element rotatably mounted on one of said flaps.

14. Means for rendering equal the effect of gravity independent of the mode of installation in flow regulators for gaseous substances, particularly for air in air-conditioning and ventilation installations, and for maintaining the volumetric flow rate of the gaseous substance at desired magnitude with sufficient accuracy when differential pressure acting across the flow regulator varies within given limits, said flow regulator comprising an envelope and a regulating member turnably disposed in a flow passage confined by the envelope, said regulating member disposed to turn with increasing differential pressure progressively crosswise with reference to the direction of flow and assume an equilibrium position in response to a torque produced by the gaseous substance on the flow regulating member and a counter-torque dependent on the position of the regulating member, such that the requisite pressure drop for maintaining the volumetric flow at pre-selected magnitude is achieved,
the means comprising a member supporting a weight which by its mass produces the counter-torque, said weight-supporting member being connected to a turnably disposed element and, in an installation mode deviating from the basic installation, the member supporting the weight is disposed to be turnable with reference to said turnably disposed element,
the means comprising pointer means disposed to indicate the current installation mode,
characterized in that the pointer means comprise a ball throttling by gravity along a track.

15. Means for rendering equal the effect of gravity independent of the mode of installation in flow regulators for gaseous substances, particularly for air in air-conditioning and ventilation installations, and for maintaining the volumetric flow rate of the gaseous substance at desired magnitude with sufficient accuracy when differential pressure acting across the flow regulator varies within given limits, said flow regulator comprising an envelope and a regulating member turnably disposed in a flow passage confined by the envelope, said regulating member disposed to turn with increasing differential pressure progressively crosswise with reference to the direction of flow and assume an equilibrium position in response to a torque produced by the gaseous substance on the flow regulating member and a counter-torque dependent on the position of the regulating member, such that the requisite pressure drop for maintaining the volumetric flow at pre-selected magnitude is achieved,
the means comprising a member supporting a weight which by its mass produces the counter-torque, said weight-supporting member being connected to a turnably disposed element and, in an installation mode deviating from the basic installation, the member supporting the weight is disposed to be turnable with reference to said turnably disposed element,
further comprising levelling means for a turning axis of the regulating member, wherein said levelling means comprise
a protective casing, and
a levelling ball disposed in said protective casing.

16. Means for rendering equal the effect of gravity independent of the mode of installation in flow regulators for gaseous substances, particularly for air in air-conditioning and ventilation installations, and for maintaining the volumetric flow rate of the gaseous substance at desired magnitude with sufficient accuracy when differential pressure acting across the flow regulator varies within given limits, said flow regulator comprising an envelope and a regulating member turnably disposed in a flow passage confined by the envelope, said regulating member disposed to turn with increasing differential pressure progressively crosswise with reference to the direction of flow and assume an equilibrium position in response to a torque produced by the gaseous substance on the flow regulating member and a counter-torque dependent on the position of the regulating member, such that the requisite pressure drop for maintaining the volumetric flow at pre-selected magnitude is achieved, the means comprising a member supporting a weight which by its mass produces the counter-torque, said weight-supporting member being connected to a turnably disposed element and, in an installation mode deviating from the basic installation, both the member supporting the weight and the weight are disposed to be turnable with reference to said turnably disposed element,
additionally comprising
means for changing the equilibrium position of the the regulating member, which comprise
knob means connected with said axis for turning the same, and
gear means interconnecting said weight and said axis, with position of said weight being shifted by rotation of said axis through said knob means.

17. The means of claim 16, wherein said gear means are constituted by a gear attached to said weight-supporting member and grooves formed by a pinion rack on said axis.

18. Means for rendering equal the effect of gravity independent of the mode of installation in flow regulators for gaseous substances, particularly for air in air-conditioning and ventilation installations, and for maintaining the volumetric flow rate of the gaseous substance at desired magnitude with sufficient accuracy when differential pressure acting across the flow regulator varies within given limits, said flow regulator comprising an envelope and a regulating member turnably disposed in a flow passage confined by the envelope, said regulating member disposed to turn with increasing differential pressure progressively crosswise with reference to the direction of flow and assume an equilibrium position in response to a torque produced by the gaseous substance on the flow regulating member and a counter-torque dependent on the position of the regulating member, such that the requisite pressure drop for maintaining the volumetric flow at preselected magnitude is achieved,
the means comprising a member supporting a weight which by its mass produces the counter-torque, said weight-supporting member being connected to a turnably disposed element and, in an installation mode deviating from the basic installation, the member supporting the weight is disposed to be turnable with reference to said turnably disposed member additionally comprising
a second weight situated on said turnable element.

* * * * *